Jan. 27, 1959

E. P. LARSH 2,870,594

NUT GATHERER

Filed May 3, 1954

INVENTOR.
EVERETT P. LARSH
BY
HIS ATTORNEYS

United States Patent Office 2,870,594
Patented Jan. 27, 1959

2,870,594

NUT GATHERER

Everett P. Larsh, Dayton, Ohio

Application May 3, 1954, Serial No. 427,218

11 Claims. (Cl. 56—328)

This invention relates to a nut gathering and hulling machine. The invention relates more particularly to a machine for the gathering and hulling of tung nuts, but the invention is not so limited in that it is capable of gathering and hulling many other types of nuts.

A nut gathering operation usually occurs after all or most of the nuts have fallen from the trees upon which they have grown. A considerable amount of time may elapse between the time the nuts first begin to fall and the time of the nut gathering operation. During the length of time that the nuts lie upon the ground before they are gathered, a great amount of debris, such as leaves and other material fall upon and around the nuts.

Furthermore, the nuts may settle into the ground or dust and other types of erosion may cause dirt to cover or to partially cover some of the nuts. Therefore, many of the nuts which fall upon the ground are covered with debris and/or soil when the nut gathering operation begins.

This debris must either be gathered by a nut gathering machine and picked up when the nuts are gathered from the ground or else this debris must be removed from the nuts before the nuts are picked up by a nut gathering machine. Also, those nuts which are buried or partially buried must be removed from the ground as they are gathered.

After nuts are gathered, it is desirable to hull the nuts before the nuts are stored. Unhulled nuts require much more storage space than hulled nuts. Furthermore, if the hulls are left in the field among the nut trees, they do not need to be hauled; hence, no additional hauling space for the hulls is required. Handling costs are reduced. The hulled nuts dry more readily and hence have less moisture content. Too much moisture often results in excessive heating of the nuts in storage. Therefore, there is a lesser possibility of damage in storage to hulled nuts.

Thus, a very desirable machine in the nut industry is a machine which gathers the nuts and hulls the nuts while the machine moves among the trees gathering the nuts from the ground and which machine discharges the hulls therefrom as it hulls the nuts.

A hulling operation must be performed by removing the hulls without injury to the nuts. Many types of nuts are useless if they are injured during the hulling operation.

An object of this invention is to provide a nut picking machine which has means for removing the debris from the nuts before the nuts are picked from the ground.

Another object of this invention is to provide a nut gathering machine which has means for removing the nuts which have become buried or partially buried under the soil of the ground.

Another object of this invention is to provide an easily maneuvered machine which has means for gathering of nuts and for the hulling of the nuts which are gathered by the machine.

Another object of the invention is to provide an easily maneuvered nut gathering and hulling machine the apparatus of which may be operated by the propelling means.

Another object of this invention is to provide a nut gathering machine which has means for containing the nuts which are gathered from the ground and which containing means may be easily and readily lifted for the purposes of dumping the contents of the containing means as desired.

Another object of this invention is to provide a nut gathering and hulling machine which has means for removing the hulls from the nuts and which has means for expelling the hulls from the machine as the hulls are removed from the nuts.

Another object of the invention is to provide a machine capable of gathering and hulling many types of nuts.

A further object of the invention is to provide a nut hulling machine which hulls nuts without injury to the nuts.

Other objects and advantages reside in the construction of parts, the combination thereof and the mode of operation as will become more apparent from the following description.

Figures 12, 13, 14, 17:
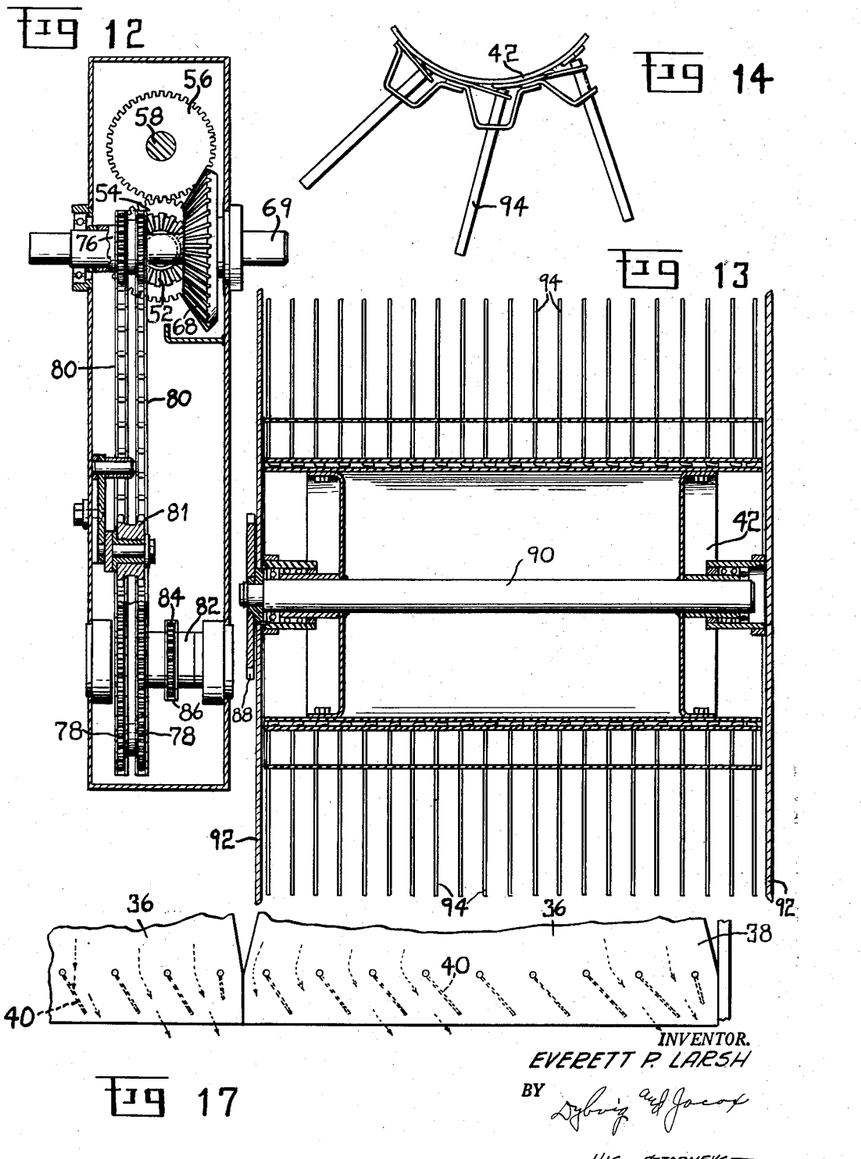
Figure 12 is a sectional view taken substantially on the line 12—12 of Figure 11.
Figure 13 is an enlarged sectional view taken substantially on line 13—13 of Figure 10.
Figure 14 is a fragmentary side elevational view of a nut picking wheel of this invention.
Figure 17 is a fragmentary front elevational view showing a portion of the air conduit means including the air deflectors thereof.

Referring to the drawings in detail, reference numeral 20 indicates in general a nut picking and hulling machine of this invention which may be mounted and supported upon a conventional tractor 21 provided with rear wheels 22 and forward wheels 24. The nut picking and hulling machine of this invention comprises in general a nut picker section 26 carried at the forward end of the tractor 21, a hopper or nut container section 30 at the rearward end of the tractor 21 and a huller section 32 intermediate the picking section 26 and the hopper section 30. The picker section 26 includes a plurality of blowers 34 mounted at the upper portion of the picker section 26. Each of the blowers 34 is connected to an air conduit 36 through which air from the blowers 34 is forced downwardly at the forward end of the nut picker section 26. At the lower portion of each conduit 36 is a diverging flange portion 38 having a plurality of air deflector plates 40. As is noted in Figure 17, each of the air deflector plates 40 is disposed at a different inclined angle from the other air deflector plates 40. The inclined angle of the air deflector plate 40 farthest from the center of the picker unit 26 is the greatest. The angle of inclination of each adjacent plate 40 with respect to the vertical is increasingly greater between the center deflector plate 40 and the outermost deflector plate 40, so that air which is forced from the blowers 34 through the conduits 36 and the diverging flange portions 38 is forced to move outwardly toward the side of the machine as well as downwardly toward the ground. Thus, leaves and other debris upon the ground are forced forwardly and outwardly toward the sides of the picker unit 26 clearing a path equal to or greater than the width of the picker unit 26, so that the nuts lying upon the ground are clearly exposed and may be readily gathered by a plurality of picking wheels 42 which are rotatably mounted rearwardly of the diverging flanges 38.

Figures 3, 7:
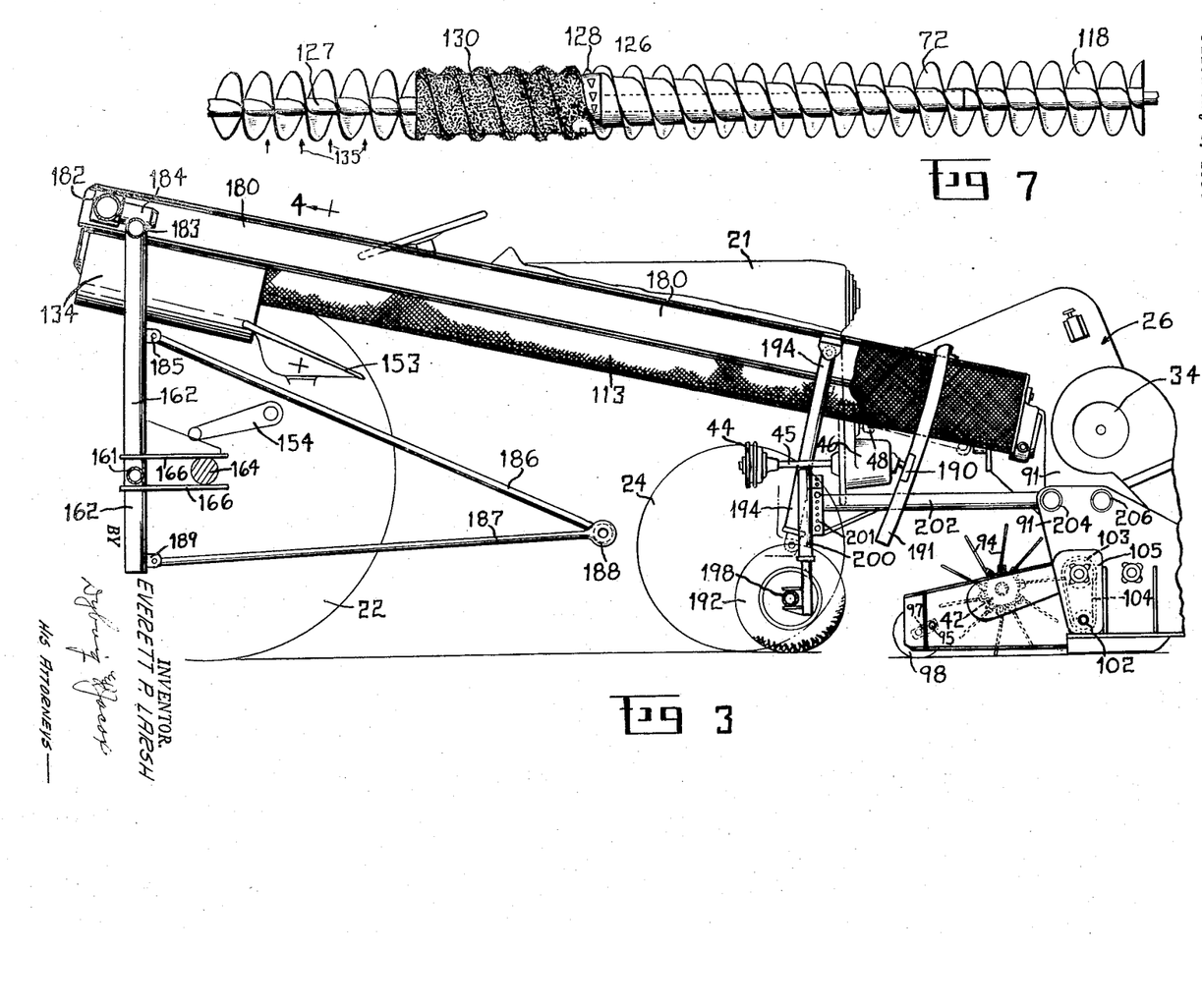
Figure 3 is a longitudinal sectional view showing a tubular housing which encloses one of the hulling augers of this invention.
Figure 7 is an elevational view of a hulling auger of this invention.
Figure 11:
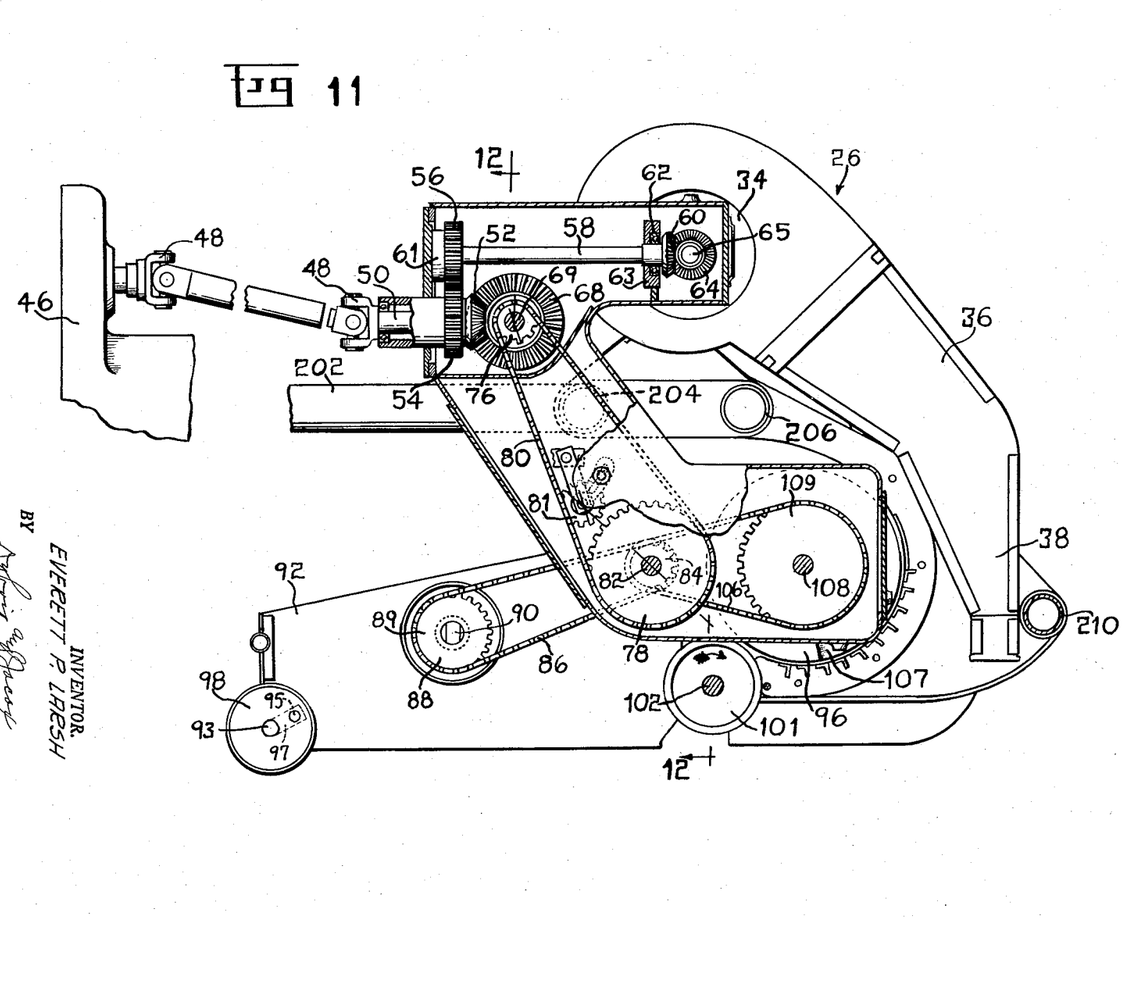
Figure 11 is an elevational view with parts broken away and shown in section of the picker unit including the power supply means and connections thereof to the operable elements of the picker unit of this invention.
Figure 15:
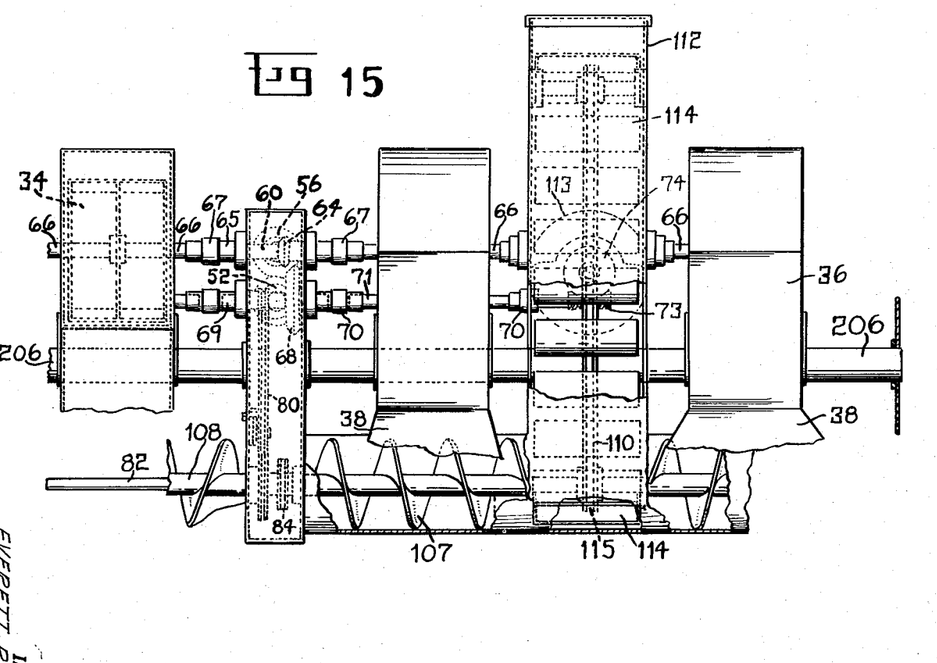
Figure 15 is a fragmentary front elevational view with parts broken away of the picker unit of this invention.

Power for operation of the apparatus of this invention is provided by the engine of the tractor. As best shown in Figures 3 and 11, a pulley wheel 44 is driven by the engine of the tractor. Power is transmitted through a shaft 45 which supports the pulley wheel 44 through a gear unit within a housing 46 to a double universal unit 48. Power is further transmitted from the double universal unit 48 through a short rotatably mounted shaft 50 which is attached to the universal unit 48. A bevel gear 52 and a spur gear 54 are attached adjacent the end of the shaft 50. The spur gear 54 drives a complementary spur gear 56 which is shown mounted directly above the spur gear 54. The gear 56 is attached to a rotatably mounted shaft 58 at one end thereof and a bevel gear 60 is attached at the other end thereof. The shaft 58 is supported by bearings 61 and 62. The bearing 62 is supported in a bearing support block 63. The bevel gear 60 drives a complementary bevel gear 64 which is mounted upon a shaft 65 which is normal to the shaft 58. The shaft 65 drives aligned blower shafts 66 of blowers 34 which are joined by means of couplings 67, as best shown in Figure 15. Driven by the bevel gear 52 at the end of the shaft 50 is a complementary bevel gear 68. The bevel gear 68 is supported upon a rotatable shaft 69 which extends in either direction from the gear 68. The shaft 69 through a plurality of couplings 70 and shafts 71 drives a pair of hulling augers 72 of the hulling unit 32 by means of worm gears 73. The worm gears 73 are attached to shafts 71 and each worm gear 73 drives a gear 74 which is attached to one of the hulling augers 72.

Upon the shaft 69 is a double sprocket 76. The sprocket 76 drives a larger double sprocket 78 through a pair of chains 80 which also engage an idler wheel 81. The sprocket 78 is attached upon a rotatable shaft 82 which is mounted across the lower portion of the picker section 26.

Mounted at equal intervals upon the shaft 82 are smaller sprockets 84 each of which drives a chain 86 which operatively attaches to a sprocket 88, there being one sprocket 88 attached to a rotatably mounted shaft 90 of each of the picking wheels 42. Each of the wheels 42 is attached to one of the rotatably mounted shafts 90 each of which is supported between a pair of pivotally mounted arms 92, as is clearly shown in Figures 10, 11 and 13. Attached to each of the picking wheels 42 are a plurality of picking fingers 94, each finger 94 being angularly offset with respect to the radii of its respective picking wheel 42, as clearly shown in Figures 10 and 14. The picking wheels 42 are rotated by the chains 86 at such a rate counterclockwise, as indicated in Figure 10, that nuts which lie upon the ground are engaged by the picking fingers 94 and lifted and thrown or tossed into a receiver trough 96 extending across the picker unit 26 directly to the rear of the flanged portions 38 of the air conduits 36.

Many nuts, which have fallen from the trees, are buried or partially buried in the ground so it is desirable that the picking fingers move into the soil and lift out the nuts therein.

Each of the arms 92 is pivotally attached to a frame structure 91 of the picker unit 26. The elevation of each picking wheel 42 is governed by an individual rotatably mounted gauge roller 98. Each of the gauge rollers 98 is rotatably carried by a shaft 93 which is attached to a pair of pivotally adjustable short arms 97. The short arms 97 are attached to the arms 92 by means of pivot shafts 95. The short arms 97, pivotally carried by the shaft 95, may be secured thereupon in any adjusted position by any suitable means, not shown. Thus, the depth of operation of the picking fingers 94 can be easily controlled by pivotal adjustment of the short arms 97.

Figures 10, 16:
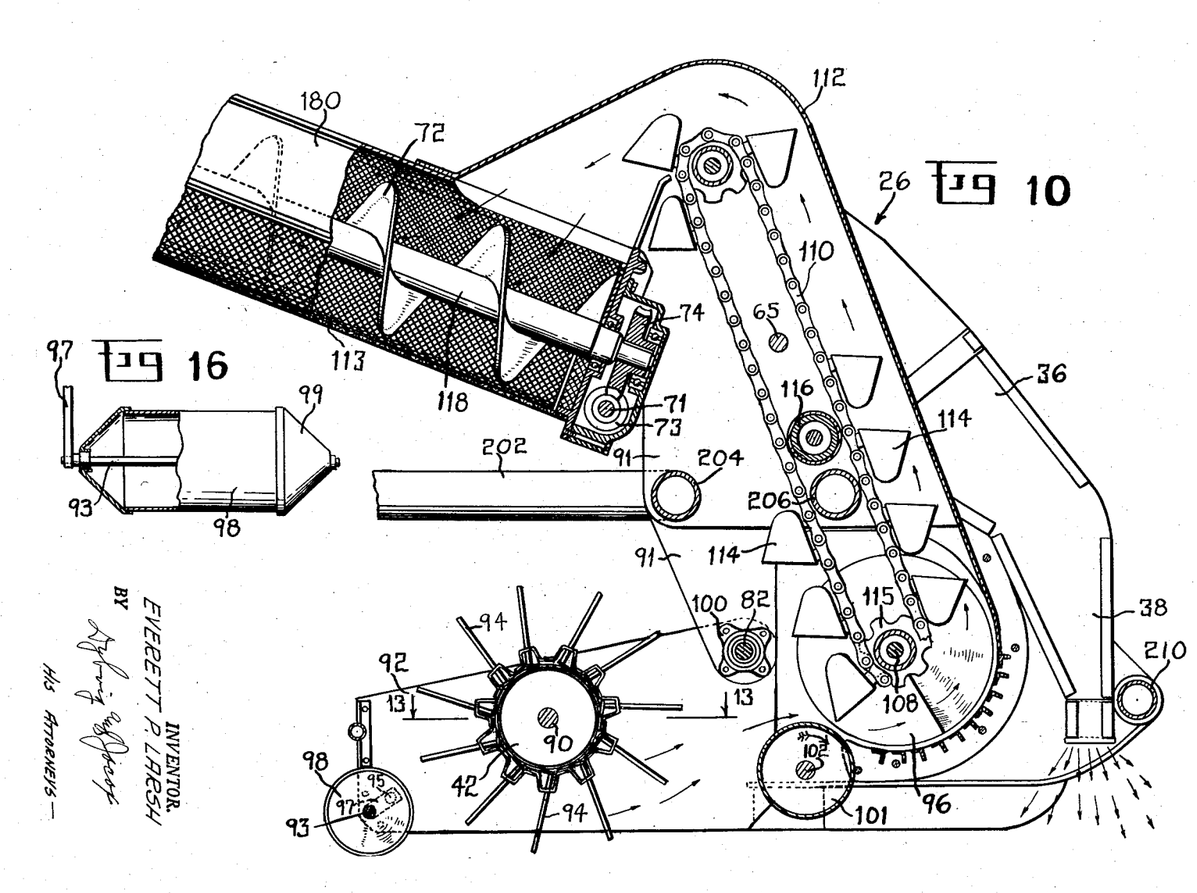
Figure 10 is an elevational view of the picker unit of this invention, with parts broken away and shown in section.
Figure 16 is a side elevational view with parts broken away of a ground engaging gauge roller of this invention adapted to control the position of operation of one of the nut picking wheels of this invention.

As best shown in Figure 16, each of the gauge rollers 98 is cylindrical in shape, having conical ends 99. The conically shaped ends 99 permit easier turning and guiding of the machine 20 as the gauge rollers slide angularly as the machine is turned. The length of each of the gauge rollers 98 is substantially equal to the length of a picking wheel 42. As the nut picking and hulling machine 20 traverses the ground, each of the gauge rollers 98 governs the elevation or depth of operation of its respective picking wheel 42. Each pair of arms 92 pivotally rotates about the shaft 82 as the gauge roller 98 lowers and raises according to the elevation of the surface of the ground over which the nut picking machine travels.

The shaft 82 is journaled in pivotal support members 100, one of which members is attached to each of the arms 92 for pivotal movement of the arms 92 about the axis of the shaft 82.

As the shaft 82 is rotated, as described above, the shaft 82 also causes rotation of a plurality of aligned auxiliary wheels 101 carried upon shafts 102 which are mounted directly at the rear of the receiving trough 96. Sprocket wheels 103 are also mounted upon the shaft 82 for operation of the auxiliary wheels 101 which are rotated clockwise, as shown in Figures 10 and 11, and are driven by a plurality of chains 104 and are partially enclosed in a housing 105, as best shown in Figure 3. The auxiliary wheels 101 rotate so that the upper surface thereof moves toward the receiver trough 96. Thus, these wheels 101 aid in the movement of nuts picked from the ground by the fingers 94 of the picking wheels 42 so that the nuts picked from the ground move very readily from the fingers 94 into the receiver trough 96.

Also driven by the shaft 82 by means of a sprocket similar to sprocket 84 attached thereto and a chain 106 is a horizontally disposed helical conveyor 107 provided with a shaft 108 which is driven by a sprocket 109 mounted thereon, as best shown in Figures 11 and 15. The shaft 108 of the helical conveyor 107 extends across the forward portion of the picker unit 26 within the receiver trough 96 directly behind the diverging portions 38 of the air conduit members 36. Some of the convolutions of the helical conveyor 107 are wound in a left hand direction, and a portion of the convolutions thereof are in a right hand direction, so that nuts picked from the ground by the picking wheels 42 are carried within the receiver trough 96 toward one of a pair of elevators 110 which are provided with housings 112. The nuts are thus carried upwardly by a plurality of cup members 114 of the elevators 110 from the receiver section 96, as best shown in Figures 10 and 15. The elevators 110 are driven by sprockets 115 which are attached to the helical conveyor shaft 108, as best shown in Figure 15. A free idler wheel 116 keeps opposite sides of the elevator 110 from engaging each other during movement thereof.

At the uppermost portion of the elevators 110 the nuts are dropped from the cup members 114 into the forward portion of a plurality of tubular housings 113 of the hulling unit 32. Each of the housings 113 encloses one of the hulling augers 72. One of the hulling augers 72 is clearly shown in Figure 7. The convolutions of each hulling auger 72 are substantially equally spaced throughout its length. However, a body portion 118 of each hulling auger 72 increases in diameter gradually beginning at the forward end thereof to approximately the midsection thereof, as best shown in Figure 7.

As stated above, a gear 73 drives each hulling auger 72 through a connecting gear 74. As the nuts are dropped into the tubular housings 113 of the hulling augers 72 the nuts are carried rearwardly by means of the hulling augers 72. Each of the hulling augers 72 is angularly disposed so that the forward end thereof is slightly lower than the rearward end thereof. As the hulling augers 72 rotate, nuts are carried rearwardly and upwardly within the tubular housings 113. As clearly observed, the tubular housings are perforated with a plurality of apertures. These housings 113 may consist of conventional expanded metal, or of sheet metal having a plurality of apertures therethrough, or the housings may consist of a reticulated metalwork. As the nuts are moved rearwardly within the housings 113, the nuts are forced toward the perforated walls of the housings 113 due to the fact that the body portion 118 of the hulling augers gradually increases in size from the forward end thereof toward the rearward end thereof. As the nuts are moved rearwardly by the hulling augers 72 and are forced toward the apertures of the tubular housings 113, the hulls of the nuts are broken by pressure exerted by the hulling augers 72 as the nuts are pressed against the perforated walls of the tubular housing 113. Some of the hulls of the nuts are broken so that the small pieces of the hulls are squeezed outwardly through the apertures of the housings 113 as the nuts are carried rearwardly within the housings 113.

Aligned sections 126 and 127 of the body of the hulling augers 72 at the rearward portion thereof are cylindrical rather than tapered. At the forward end of the section 126 are a plurality of pointed boss members 128 which aid in removing the broken hulls from the nuts as the hulls and nuts are moved rearwardly by the rotating hulling augers 72. After the hulls are removed from the nuts, the hulling augers 72 continue to press the smaller pieces of the hulls outwardly through the apertures in the housings 113.

Figures 1, 4:
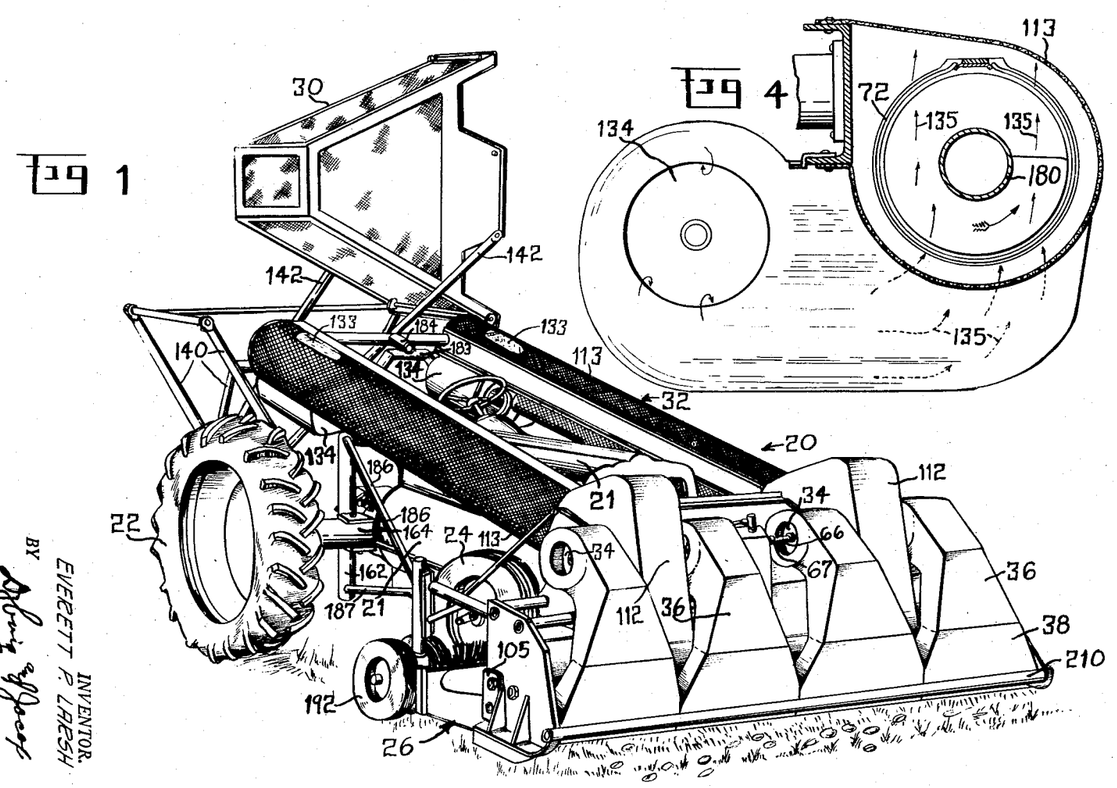
Figure 1 is a front perspective view of a nut gathering and hulling machine of this invention, with the hopper or basket in the elevated position for the dumping of nuts from the hopper.
Figure 4 is an enlarged sectional view taken substantially on line 4—4 of Figure 3.
Figures 2, 5, 6:
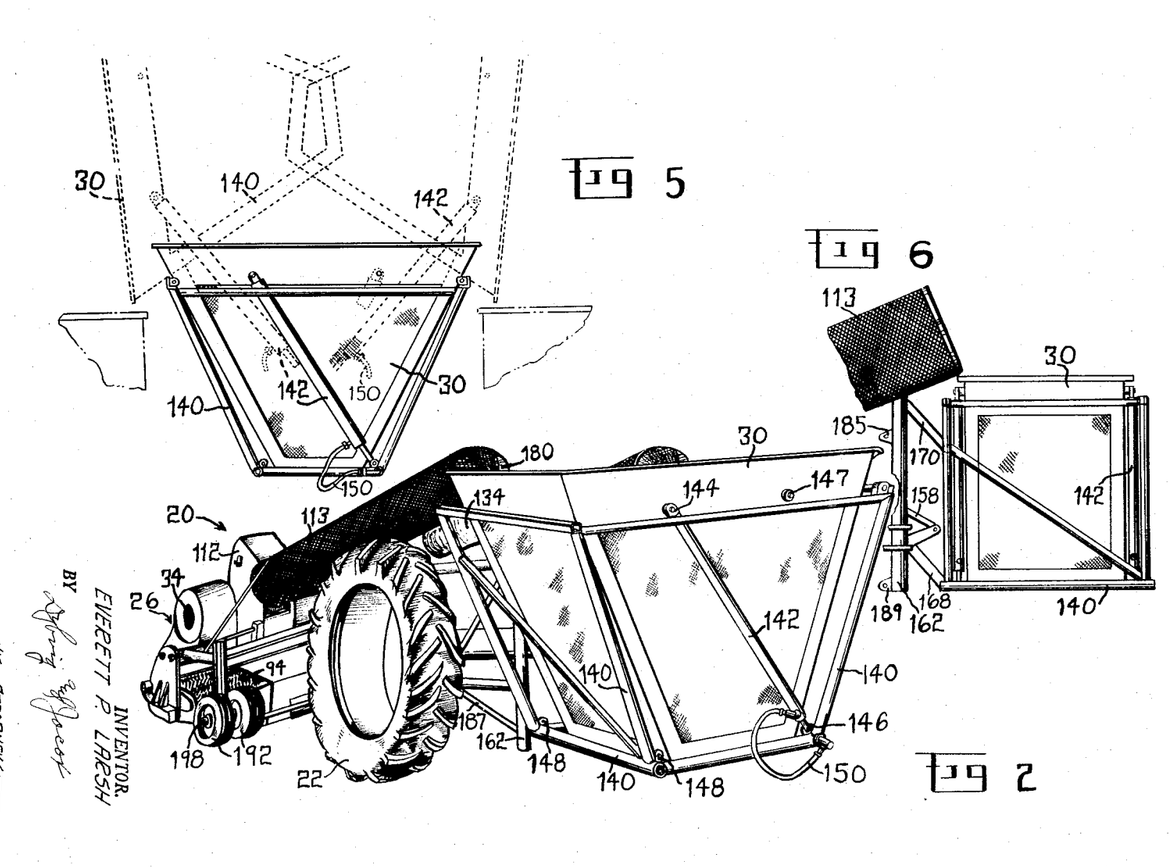
Figure 2 is a rear perspective view of the nut gathering and hulling machine of this invention, showing the hopper in its lowered position.
Figure 5 is a rear elevational view of the hopper disclosing the manner in which the hopper may be moved and lifted for unloading thereof.
Figure 6 is a side elevational view of the hopper and hopper support structure of this invention.

Immediately rearwardly of the boss members 128 on the body section 126 is a brush section 130 in which the brushing action aids in removing remaining hulls from the nuts, and the brush section 130 also performs a cleaning action upon the nuts after the hulls have been removed therefrom. The cylindrical section 127 of the hulling augers 72 is comparatively small in size. Immediately above this section 127 of each hulling auger 72 there is provided a scavenger opening 133 in the tubular housing 113. A scavenger blower member 134 is attached at the rearward portion of each of the housings 113 under the section 127 of the hulling auger 72. The blowers 134 force air upwardly, as best shown by arrows 135 in Figure 4, so that the air which is blown upwardly carries from the housings 113 pieces of hulls which have remained in the housings 113 and have not been forced through the apertures of the housing 113. Therefore, the remaining pieces of the hulls are blown upwardly and outwardly from each housing 113 through the comparatively large scavenger opening 133 at the rearward end thereof by the respective scavenger blower member 134. The hulled nuts are not carried outwardly through the openings 133 by the air forced by the blowers 134 due to the difference in specific gravity of the nuts and the pieces of hulls. Also, separation of the nuts and the pieces of hulls occurs due to the fact that the nuts have a generally round, curved, or cylindrical shape and the air cannot lift the nuts sufficiently to remove them from the housing 113. However, the pieces of the hulls are very irregular in shape, are sometimes cup-shaped and are lifted easily by the stream of air forced by the blower 134 and thus are removed from the housing 113. The hulled nuts are carried farther rearwardly by the hulling augers 72 and are dropped from the rearward ends of the housings 113 into the hopper 30 positioned at the rear portion of the tractor 21.

The hopper 30 is supported within a hopper support structure 140. A pair of fluid motors 142 is shown attached to the hopper 30 at pivot points 144 and to the support structure 140 at pivot points 146 for dumping of the hopper in a left hand direction. If it is desired to tip or tilt the hopper 30 in a right hand direction for emptying the contents thereof, the fluid motors 142 are attached to pivot points 147 of the hopper end to pivot points 148 of the support structure 140. There is one fluid motor 142 on each of the vertical sides of the hopper 30. Fluid for operation of the fluid motors 142 is fed through flexible conduits 150.

Figure 8:
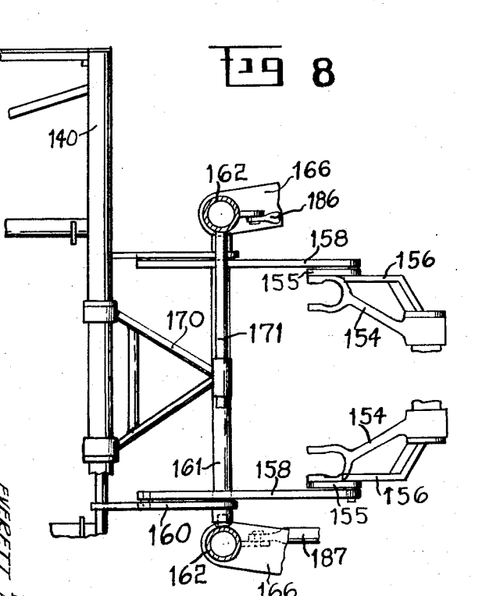
Figure 8 is a fragmentary top elevational view partly in section showing the actuating means for controlling the movement of the hopper support structure.
Figure 9:
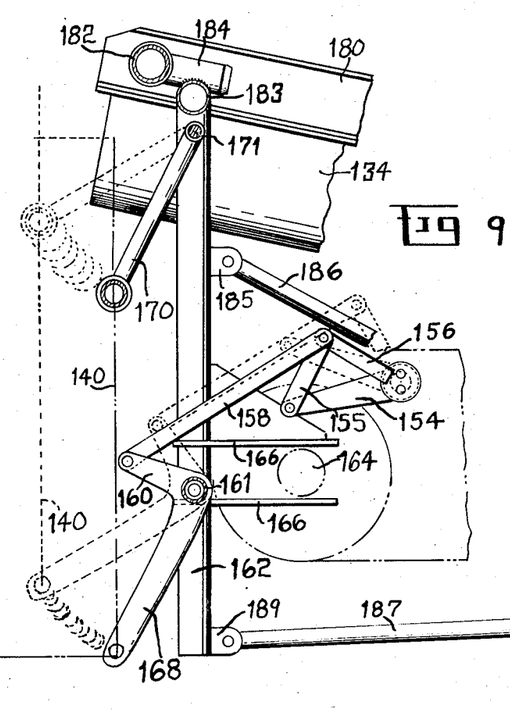
Figure 9 is a side elevational view partly in section showing the actuating means for controlling the movement of the hopper support structure.

The hopper frame structure 140 is movable outwardly and upwardly with respect to the rearward portion of the tractor 21. Below an operator's seat 153 of the tractor 21, as shown in Figure 3, is a pair of conventional fluid actuated operating arms 154 of the tractor 21. As shown in Figures 8 and 9, a pair of arms 156 is fixedly attached through a pair of links 155 to the operating arms 154 for pivotal movement therewith. At the ends of the pivotal arms 156 is attached a pair of connecting links 158 which connect to a pair of bell cranks 160 which are pivotally attached to a horizontal bar 161 which joins a pair of vertical support rods 162. The vertical support rods 162 are fixedly attached to a rear axle housing 164 of the tractor 21 by means of a pair of horizontally disposed plates 166. An outer arm 168 of each bell crank 160 is attached to the lower forward portion of the hopper support structure 140. The upper forward end of the hopper support structure 140 is attached to a pivotally mounted A frame member 170. The A frame member 170 is also pivotally attached to a horizontal rod 171 which is secured between the vertical supports 162. As best shown in Figure 9, as the operating arms 154 are pivoted upwardly they pivotally move the arms 156 so that the bell crank 160 is rotated by the connector link 158 and the arm 168 pivots upwardly which results in outward and upward movement of the hopper support structure 140. The length of the arms 168 is equal to the length of the A frame member 170 so that during outward and upward movement of the frame structure 140, said structure is retained horizontal. With the upward and outward movement of the hopper support structure 140, the hopper 30 attached thereto is moved outwardly from under the end of the tubular housing 113 and upwardly so that the hopper support structure 140 carries the hopper 30 a substantial distance away from the rearward ends of the tubular housings 113 so that there is sufficient clearance for the hopper 30 to be lifted and emptied. The positioning of the forward edge of the hopper 30 immediately under the rearward end of the tubular housings 113 of the huller unit 32 makes possible the dropping of nuts carried rearwardly by the hulling auger 72 directly into the hopper 30.

Each of the tubular housings 113 is attached along the length thereof to one of a pair of support beams 180 which are disposed on either side of the tractor 21 and extend substantially parallel to the longitudinal axis of the tractor 21. The rearward ends of the support beams 180 are joined one to the other through a main horizontal rod 182 which extends normally between the support beams 180. The vertical support rods 162 are joined at the upper ends thereof by a horizontal connector rod 183. The main horizontal rod 182 is attached to the connector rod 183 by means of a pivotal joint 184. The pivotal joint 184 provides means for pivotal movement about two axes which are normal to each other. The combined picker and huller units may tilt to follow the terrain of the ground, as one of the beams 180 lowers with respect to the other beam 180. The pivotal joint 184 also permits raising and lowering of the picker unit providing pivotal movement to the support beams 180 as the connector rod 182 pivots in the pivotal joint 184.

An auxiliary structure comprising pairs of rods 186 and 187 provides an additional attachment between the tractor 21 and the vertical support rods 162, as clearly shown in Figure 3. The rods 186 and 187 are attached to lugs 185 and 189 respectively on the vertical support rods 162 and are joined at the other ends thereof to the lower frame structure of the tractor 21 at substantially the midportion thereof by means of bolts 188.

The forward portion of the longitudinal support beams 180 is carried at the front end of the tractor by means of fluid motors 194, as clearly shown in Figure 3. The frame structure 91 and the housings 112 of the elevators 110 are attached to the forward ends of the support beams 180. The fluid motors 194 thus provide means by which the picker unit 26 may be lowered and raised with respect to the ground as the forward end of the support beams 180 are raised and lowered. A guide arm 190 pivotally attached to the forward end of the gear housing slidably engages an arcuate guide channel 191 which is attached to the frame structure 91. The guide arm 190 and the guide channel 191 thus guide the lowering and raising of the picker unit 26 which movement is actuated by the fluid motors 194.

A pair of auxiliary wheels 192, adjacent the forward steering wheels 24 of the tractor 21, aid in supporting the picker unit 26. Attached to an axle housing 198 of the auxiliary wheels 192 is a plurality of vertically disposed rod members 200. An adjustment bracket 201 is attached to each of the vertical support rods 200. A plurality of horizontal forwardly extending rods 202 joins the brackets 201 to a pair of transverse support rods 204 and 206 near the forward portion of the picker unit 26. A forward lower horizontal transverse support rod 210 is attached to the extreme forward portion of the picker unit 26. As stated above, the pivotal joint 184 provides means by which the combined picker and huller units may tilt to follow the terrain of the ground as the elevation of each side of the machine is determined by the auxiliary wheels 192.

The particular arrangement of the convolutions, of the brush structure, and of the body of the hulling auger may be altered or changed and the particular aperture arrangement of the tubular housings may be varied in order to more satisfactorily remove hulls from various types of nuts.

Naturally, it is understood that the machine of this invention may also be employed for gathering objects other than nuts.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a nut gathering and hulling machine comprising a supporting structure movable upon the ground and having a forward portion and a rearward portion, blower means attached to the supporting structure at the forward portion thereof, the blower means being provided with conduit means extending to a position adjacent the ground for forcing air upon the ground at the forward end of the supporting structure and in advance thereof, movable picking means attached to the support structure and disposed rearwardly of the conduit means for engaging the nuts, nut receiving means carried by the supporting structure and disposed adjacent the picking means, the picking means transferring nuts from the ground to the receiving means, elevator means carried by the supporting structure and disposed adjacent the receiving means for lifting nuts from the receiving means, container means attached to the supporting structure adjacent the rearward portion thereof, auger means carried by the supporting structure intermediate the elevator means and the container means, the auger means transferring nuts from the elevator means to the container means, and a tubular housing closely enclosing the auger means.

2. A nut gathering machine comprising support structure, means carried by the support structure for forcing air upon the ground in advance of the machine for cleaning debris from nuts lying in the path of the machine, a receiver section carried by the support structure for receiving nuts picked from the ground, movable finger means attached to the support structure adjacent the receiver section for picking nuts from the ground and for depositing nuts in the receiver section, hopper means attached to the support structure in spaced relation from the receiver section for retaining nuts, and conveyor means attached to the support structure intermediate the receiver section and the hopper means for transferring nuts from the receiver section to the hopper means.

3. A nut gathering machine for movement upon the ground upon which nuts are lying including a support structure, a picker unit carried by the support structure adjacent a forward end thereof, a container unit pivotally supported adjacent the other end of the support structure, a transfer unit carried by the support structure intermediate the picker unit and the container unit, the picker unit comprising a plurality of rotatably mounted picking wheels carried by the support structure at the lower portion thereof, the picking wheels being provided with a plurality of fingers engageable with the ground, each finger being angularly disposed with respect to a radius of the wheel, a plurality of blower members carried by the support structure, conduit means extending from each blower member to a position at the lower portion of the picker unit and in spaced relation from the picking wheels, the conduit means being provided adjacent its lower end with a plurality of air deflectors, the air deflectors being angularly disposed with respect to the conduit, the air deflectors also being angularly disposed one with respect to the others, each air deflector having a lesser inclined angle with respect to the horizontal than the air deflector adjacent thereto and disposed closer to the center of the picker unit so that air forced by the blower members is directed forwardly of the picker unit and angularly toward the side of the picker unit, a conveyor rotatably mounted within the picker unit forwardly of the picking wheels, a plurality of elevators intermediate the conveyor and the transfer unit, the conveyor carrying nuts to the elevators which are picked from the ground by the picking wheels, the transfer unit comprising a plurality of rotatably mounted helical augers, and a tubular housing encircling each helical auger.

4. In a nut gathering apparatus provided with means for movement upon the ground, the combination comprising a support structure, a plurality of independently mounted arms pivotally attached to the support structure and freely movable with respect to the support structure, a ground engaging gauge roller attached to each pivotally mounted arm, a rotatably mounted picking wheel carried by each pivotally mounted arm, an arcuate receiver trough carried by the support structure adjacent the picking wheels, a rotatably mounted auxiliary wheel supported intermediate each picking wheel and the receiver trough, means connected to the picking wheels and the auxiliary wheels for rotation thereof in opposite directions, the picking wheels rotating in a direction so that the portion of the wheel in engagement with the ground moves in the direction of movement of the apparatus, engaging nuts upon the ground and tossing the nuts toward the receiver trough, the auxiliary wheels having the upper surface thereof moving toward the receiver trough thus aiding in the movement of nuts into the receiver trough, a hopper carried by the support structure in spaced relation from the receiver trough, and conveyor means attached to the support structure intermediate the receiver trough and the hopper for transferring nuts from the receiver trough to the hopper.

5. In a nut gathering machine having a forward portion and a rearward portion and provided with means for movement upon the ground, the combination comprising a support structure, a plurality of independently mounted arms freely pivotally attached to the support structure adjacent the forward portion of the machine, a ground engaging gauge roller rotatably attached to each pivotally mounted arm, a rotatably mounted picking wheel provided with picking fingers and carried by each pivotally mounted arm, a plurality of blowers carried by the support structure, conduit means attached to the blowers and extending to positions adjacent the ground and at the forward portion of the machine for directing air from the blowers to the ground in advance of the machine, an elongate arcuate receiver trough extending transversely to the line of movement of the machine and carried by the support structure adjacent the picking wheels, means attached to the picking wheels and the blowers for operation thereof, the picking wheels engaging nuts upon the ground and tossing the nuts into the receiver trough, a hopper carried by the support structure adjacent the rearward portion of the machine, and conveyor means for transferring nuts from the receiver trough to the hopper.

6. A nut gathering and hulling machine provided with means for attachment to a tractor and provided with means for operation by the tractor, the combination comprising a support structure pivotally attached to the tractor, a picker unit carried at the forward end of the tractor, the picker unit including a plurality of arms, each arm having an end thereof pivotally attached to the support structure, a ground engaging gauge roller rotatably attached to each arm adjacent the other end thereof, a picking wheel rotatably carried by each arm intermediate the ends thereof, a blower supported by the support structure and provided with conduit means having an open portion adjacent the ground for directing air upon the ground clearing debris from the ground in advance of the picking wheels, a receiver trough carried by the support structure normal to the line of movement of the machine and adjacent the picking wheels and forwardly thereof, a screw conveyor rotatably supported within the receiver trough parallel therewith, an elevator having a portion thereof adjacent the screw conveyor, means attached to the blower and the picking wheels and the screw conveyor and the elevator for operation thereof so that nuts are picked from the ground and transferred to the receiver trough and nuts are moved in the receiver trough by the screw conveyor to the elevator and nuts are carried upwardly by the elevator from the receiver trough, a transfer unit carried by the support structure rearwardly of the picker unit and substantially parallel to the line of movement of the machine, the transfer unit including a rotatably mounted auger, the auger having a body member and a plurality of helical convolutions, a tubular housing enclosing the auger, a hopper support frame pivotally attached to the support structure adjacent the rearward end of the machine and adjacent the rearward end of the tubular housing, a hopper pivotally supported by the hopper support frame, and fluid motor means attached to the hopper and to the hopper support frame for lifting and pivotally tipping the hopper to either side of the hopper support frame for emptying the contents of the hopper.

7. A nut gathering apparatus for use with a tractor operable upon the ground and having a power unit, the combination comprising a support structure attachable to the tractor, an air blower supported by the support structure adjacent the forward end of the tractor, a conduit member attached to the blower and extending downwardly therefrom to a position adjacent the ground, a plurality of arms pivotally attached at one end thereof to the support structure adjacent the conduit members and rearwardly thereof, the arms being freely pivotal with respect to the support structure, a guide roller rotatably attached to each arm at the other end thereof, a plurality of movable nut engaging fingers supported by each of the arms intermediate the ends thereof, a receiver trough carried by the support structure intermediate the conduit members and the nut engaging fingers, a container unit carried by the support structure rearwardly of the receiver trough, conveyor means carried by the support structure between the container unit and the receiver trough for delivering nuts from the receiver trough to the container unit, and means connecting the power unit of the tractor to the blower and to the movable fingers and to the conveyor means for operation thereof from the power unit of the tractor.

8. A nut gathering apparatus provided with means for attachment to a tractor and provided with means for operation by the tractor, the combination comprising a support structure pivotally attached to the tractor, a picker unit carried at the forward end of the tractor, the picker unit including a plurality of substantially parallel elongate arms, each arm having one end thereof pivotally attached to the support structure, a ground engaging gauge roller rotatably attached to each arm adjacent the other end thereof, a nut engaging picking member rotatably carried by each arm intermediate the ends thereof, a blower supported by the support structure at the forward end thereof and provided with conduit means having an open portion adjacent the ground for directing air upon the ground in advance of the picking member, a receiver trough carried by the support structure adjacent the picking member forwardly thereof and substantially normal to the line of movement of the tractor, an elongate screw conveyor rotatably supported within the receiver trough and parallel therewith, an elevator carried by the support structure and having a portion thereof within the receiver trough, a conveyor unit carried by the support structure rearwardly of the picker unit, a hopper support member pivotally attached to the support structure adjacent the rearward end of the tractor, the hopper support member being movable upwardly and rearwardly from said support structure, linkage means joining the tractor to the hopper support member, the linkage means being operable by the tractor to move the hopper support member upwardly and rearwardly and vice versa, a hopper pivotally supported by the hopper support member and movable upwardly and laterally therefrom, and fluid motor means attached to the hopper and the hopper support member for lifting and pivotally tipping the hopper to either side of the hopper support member for emptying the contents of the hopper.

9. A nut gathering apparatus for use with a tractor having a power unit and operable thereby, the tractor being movable upon the ground, the combination comprising a support structure attachable to the tractor, a plurality of air blowers supported by the support structure adjacent the forward end of the tractor, a plurality of aligned conduit members attached to the blowers and extending downwardly therefrom and having openings therein adjacent the ground, a plurality of substantially parallel arms pivotally attached at one end thereof to the support structure adjacent the conduit members and rearwardly thereof, the arms being freely pivotal with respect to the support structure, a plurality of guide rollers, there being a guide roller rotatably attached to each pair of arms at the other end thereof opposite the pivotal axis, each roller being engageable with the ground, a plurality of rotatable ground engaging fingers supported by the arms intermediate the ends thereof, a receiver trough carried by the support structure intermediate the conduit members and the nut engaging fingers, a container unit carried by the support structure rearwardly of the receiver trough, transfer means carried by the support structure and having portions adjacent the receiver trough and the container unit for delivering nuts from the receiver trough to the container unit, and means operably connecting the blowers and the movable fingers and the helical conveyor means to the power unit for operation thereof from the power unit of the tractor.

10. A gathering apparatus provided with means for attachment to a tractor and provided with means for operation by the tractor, the combination comprising a support structure pivotally attached to the tractor, a plurality of pairs of substantially parallel elongate arms, each arm having one end thereof pivotally attached to the support structure, a link member adjustably attached at the other end of each of the arms, a ground engaging gauge roller rotatably attached to each pair of link members, a picking member rotatably carried by each pair of arms intermediate the ends thereof and having means for rotation thereof, an air blower supported by the support structure and provided with conduit means for directing air upon the ground in advance of the picking member, and a receiver member carried by the support structure adjacent the picking member.

11. A nut gathering and hulling machine provided with a supporting structure having a power unit, propelling means and power take-off means connected to the power unit, the combination comprising air forcing means carried by the supporting structure for blowing air upon the ground in advance of the machine, rotatable finger means attached to the supporting structure rearwardly of the air forcing means for engaging nuts lying upon the ground and for lifting the nuts from the ground, the finger means moving in engagement with the ground in the direction of movement of the machine, receiver means carried by the supporting structure adjacent the finger means and in advance of the finger means for receiving nuts delivered from the ground by the finger means, elevator means carried by the supporting structure adjacent the receiver means for lifting the nuts from the receiver means, container means attached to the supporting structure in spaced relation from the elevator means for containing nuts, and an auger member carried by the supporting structure intermediate the elevator means and the container means for transferring nuts from the elevator means to the container means.

References Cited in the file of this patent

UNITED STATES PATENTS

| | | |
|---|---|---|
| 1,276,577 | Schafler | Aug. 20, 1918 |
| 1,932,137 | Jinkerson | Oct. 24, 1933 |
| 1,985,373 | Johnston | Dec. 25, 1934 |
| 2,065,169 | Carpenter | Dec. 22, 1936 |
| 2,094,880 | Formeay | Oct. 5, 1937 |
| 2,234,599 | Johnston | Mar. 11, 1941 |
| 2,288,238 | Goodall | June 30, 1942 |
| 2,355,273 | Case | Aug. 8, 1944 |
| 2,441,244 | Kimball | May 11, 1948 |
| 2,502,810 | Waters | Apr. 4, 1950 |
| 2,508,454 | Goodwin | May 23, 1950 |
| 2,514,945 | Fortier | July 11, 1950 |
| 2,531,081 | Shippey | Nov. 21, 1950 |
| 2,542,024 | George et al. | Feb. 20, 1951 |
| 2,561,882 | Patton | July 24, 1951 |
| 2,660,849 | Knowles | Dec. 1, 1953 |
| 2,671,301 | Harrison | Mar. 9, 1954 |
| 2,679,133 | Soderholm | May 25, 1954 |
| 2,697,005 | Hagen | Dec. 14, 1954 |
| 2,756,978 | Wachsmith | July 31, 1956 |
| 2,780,904 | Bowie et al. | Feb. 12, 1957 |